United States Patent Office 2,882,177
Patented Apr. 14, 1959

2,882,177

TREATMENT OF PIGMENTS

Edwin B. Newton, Summit County, Ohio, and Daniel S. Sears, Henrico County, Va., assignors to The B. F. Goodrich Company, New York, N.Y., a corporation of New York No Drawing. Original application May 28, 1954, Serial No. 433,290. Divided and this application February 1, 1957, Serial No. 639,607

20 Claims. (Cl. 106—288)

This invention relates to reinforcing pigments for rubbery materials. More specifically, this invention relates to organic polyhydroxy coated oxygen-silicon containing inorganic-reinforcing agents and to methods for making the same.

Rubbery compositions have contained for many years reinforcing pigments to increase their hardness, stiffness, resistance to cutting, tearing and abrasion, and strength on vulcanization. It is not fully understood how these reinforcing pigments function in the rubbery mass to improve its properties but the results obtained are believed to be due to physical or chemical phenomena or a combination of both.

Carbon blacks are generally employed in rubbery compositions as the reinforcing pigments to provide some of the aforementioned properties mainly because they have been in the past the most satisfactory reinforcing pigments known. However, carbon blacks cannot be employed in light colored and white rubbery goods due to the intense covering power of the black which cannot be masked by white pigments, so if the carbon black is omitted entirely, the vulcanized article can withstand relatively little wear. A further disadvantage with the employment of carbon blacks is that their cost is gradually increasing while the available sources of raw materials for producing carbon blacks are being depleted. Accordingly, from both an economical and technical standpoint, the employment of carbon blacks as reinforcing pigments is not entirely satisfactory.

Inorganic reinforcing pigments such as silica and the like have been proposed in the past as substitutes for reinforcing pigments. However, their use has been mainly as a filler because they do not impart sufficient abrasion resistance to rubbery compositions to replace the reinforcing blacks. Moreover, they produce boardy (that is, high Durometer hardness) stocks which, in particular, are not desirable for automobile or truck tire treads. On the other hand, these materials are in great abundance, and, therefore, would afford, if properly prepared, a means for reinforcing rubbery materials at low cost and without fear of a disruption in future supplies. Accordingly, it is a primary object of the present invention to provide a new oxygen-silicon containing composition of matter useful as a reinforcing pigment for rubbery compositions.

A further object is to provide methods for imparting greatly improved reinforcing properties to oxygen-silicon containing inorganic pigments.

A still further object is to provide methods for producing vulcanized rubbery compositions containing an inorganic oxygen-silicon containing pigment having greatly improved reinforcing properties.

These and other objects and advantages of the present invention will become more apparent from the following detailed description and examples.

It has now been discovered according to the present invention that particulate inorganic oxygen-silicon containing materials treated with an organic polyhydroxy compound will impart reinforcing properties to rubbery materials comparable to those obtained with carbon blacks. The polyhydroxy compounds are easily applied as a coating on the surface of the inorganic pigment and readily disperse throughout the rubbery mass on mixing or milling. The use of such coated inorganic oxygen-silicon containing pigments requires in general little or no adjustment in compounding recipes, handling or curing times or temperatures such that they will find utility in conventional methods without any needed changes.

The oxygen-silicon containing inorganic reinforcing compounds treated according to this invention are those compounds which will potentially reinforce rubbery materials in much the same manner as carbon black due to their particle size and structure. Among these are arc silica, fume silica, so called silicon monoxide and silicon oxyimide. All of these materials are employed in finely-divided form, having an average particle size in the range of about 5 to 600 millicrons. However, of these materials, the use of "silicon monoxide" and silicon oxyimide is much to be preferred, since when treated according to the present disclosure, they produce, on vulcanization, rubbers which are similar to carbon black reinforced stocks and find utility in tire treads. Rubbers containing arc silica and fume silica are especially useful in shoe sole compositions.

The above oxygen-silicon containing pigments are made by various processes.

Arc silica is made by heating silica or a silica-furnishing material with a carbonaceous material at high temperature in a reducing atmosphere and rapidly condensing the product in air. It is essentially spherical and has a surface area of about 50–300 m.$^2$/g. and a particle size of about 5–100 mu.

Fume silica may be produced by decomposing or burning, with or without a combustible gas, a material such as ethyl silicate, silicon tetrachloride and the like. It is spherical in shape, has a surface area of about 80–200 m.$^2$/g. and a particue size of about 5–200 mu.

"Silicon monoxide," which is really a disproportionation product of silicon and silicon dioxide, having the now generally recognized formula, $(Si)_x \cdot (SiO_2)_y$ where $x$ and $y$ are integers, is made in a manner similar to that of arc silica except that the gases produced during the reaction are introduced rapidly into a vacuum chamber and rapidly cooled or condensed. This product called "monox" is described in the following U.S. Patents Nos. 875,286 (Potter); 875,675 (Potter); 993,913 (Tone); 1,104,384 (Potter); and in "Transactions of the American Electrochemical Society," vol. XII, 1907, pages 191–228 (Potter). When viewed under the electron microscope particles of the Potter "monox" comprise a mixture of substantially fibrous particles and the balance spherical and/or horn-like particles. The fibers have a ratio of width to length of from about 1:10 to 1:50 and exhibit a surface area of 60 to 200 square meters per gram. Their average length will vary from about 50 to 600 millimicrons. The spherical or horn-like particles in the mixture have an average particle size of from 5 to 200 mu and a surface area of about 200–300 m.$^2$/g. A method for increasing the amount of fibers by condensing the silicon monoxide gas under essentially nonturbulent conditions in an atmosphere of a pure inert gas is disclosed in copending application of Daniel S. Sears, Serial No. 433,020, entitled "Method of Making Pigment," and filed May 28, 1954, now U.S. Patent No. 2,823,979. A new fibrous "monox" containing nitrogen and a method for its production are set forth in copending application Serial No. 433,099, of Daniel S. Sears, entitled "Pigment and Process of Making the Same," and filed May 28, 1954, now U.S. Patent No. 2,823,980. A method for obtaining silicon monoxide substantially spherical or essentially spherical in shape having a particle size of about 5–200 mu and a surface area of 200–300 m.²/g. including its use as a reinforcing pigment in rubbery materials is also set forth in copending application of Edwin B. Newton and Daniel S. Sears, Serial No. 433,291, entitled "Reinforcement of Rubber," and filed May 28, 1954, now U.S. Patent No. 2,807,600. Both the Potter "monox" and the "monox" of the above applications are brown in color which is acceptable for certain applications such as belts and tires. However, for use in white rubber goods both the Potter "monox" and the fibrous "monox" must be heated in an oxidizing atmosphere to a high temperature but below the sintering point of the pigment for several hours as shown in copending application of Edwin B. Newton and Daniel S. Sears, Serial No. 433,289, entitled "Improving Color of Pigments," and filed May 28, 1954, to provide a product which is completely white. This is evidenced by the fact that when introduced into benzene, it disappears completely from sight indicating that it has virtually the same index of refraction as the benzene. On the other hand, Potter in his U.S. Patent Nos. 875,674, 886,637 and 908,131 suggests that a white product may be made by blowing his "monox" and air through a heated tube or through an oxidizing flame. Although this product appears white on the surface it is apparently not changed in color in the interior of the particles for when introduced into a body of benzene, the benzene immediately becomes brown in color. Moreover, when used in rubbery compositions, the so-called white product of the prior art will not produce white rubbery goods and, thus, is less desirable. It, however, is to be understood that in the specification and claims, silicon monoxide is intended to mean fibrous or spherical silicon monoxide, or mixtures thereof, whether brown, white or partially white unless otherwise defined. The fibrous silicon monoxide is to be preferred in reinforcing rubbery polymers as compared to spherical products.

Silicon oxyimide or polymeric silicon oxyimide, $(SiONH)_x$ where $x$ is an integer, is also produced in an arc furnace but the gaseous products evolved during the reaction are rapidly introduced into a reaction chamber having an atmosphere of ammonia gas and which is substantially free of oxygen. The resulting particles are essentially spherical in shape and have a particle size of about 5 to 200 millimicrons. The process of producing such a compound is fully disclosed in application of Daniel S. Sears, Serial No. 164,619, filed May 26, 1950, and entitled "Reaction Product of Silicon Monoxide and Ammonia and Rubber Compositions Containing the Same," now U.S. Patent No. 2,666,754, dated January 19, 1954.

Mixtures of the above oxygen-silicon containing compounds can be employed if desired although generally in the practice of the present invention it is preferred to use only one compound.

The polyhydroxy compounds used to coat the surface of the oxygen-silicon containing inorganic material can be selected from a large number of diols, triols, etc., sugars, and the like. The polar hydroxy groups are located desirably near each other and preferably near one end of the molecule or chain and are believed to orient themselves toward the surface of the pigment leaving the nonpolar groups to aid in mixing the pigment in the rubber. Such compounds have a dual function and are called hydrophilic-lipophilic compounds. The preferred compounds can be expressed by the formula $X[R](OH)_N$ where R is selected from the group consisting of saturated and unsaturated hydrocarbon radicals having at least 2 carbon atoms, said unsaturated aliphatic hydrocarbon radical having one carbon-to-carbon double bond, where N is at least 2, and where X is selected from the group of radicals consisting of hydrogen, alkyl, alkenyl, aryl, R'COO— and R'O— wherein R' is selected from the group of radicals consisting of hydrogen, alkyl, alkenyl and polyenyl. Halogenated derivatives of these polyhydroxy compounds may also be used.

Representative examples of compounds falling within the scope of the above formula are as follows:

Trimethylol propane

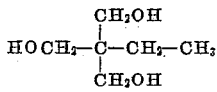

Phenyl trimethylol methane

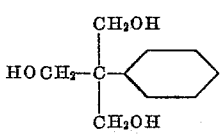

1,1,1-trimethylol-2,4,4-trimethyl pentane

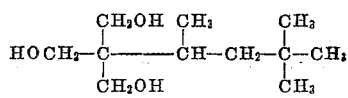

2,2-diethyl propanediol-1,3

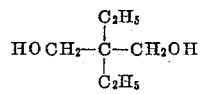

2-ethyl-2-butyl propanediol-1,3

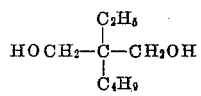

1,1,1-trimethylol hexane $$CH_3[CH_2]_4C(CH_2OH)_3$$

Pentaerythrityl monooleate

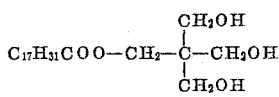

Glyceryl monoricinoleate $$C_{17}H_{33}OCOO—C_3H_5(OH)_2$$

Glyceryl monolaurate $$C_{11}H_{23}COO—CH_2—CHOH—CH_2OH$$

The polyhydroxy compound is employed in a minor amount sufficient to provide a coating on the surface of the oxygen-silicon containing inorganic pigment to impart improved abrasion resistance and flexibility to the rubbery material in which it is incorporated. Although only very minor amounts of the polyhydroxy compound will show some improvement, best results are obtained when the compound is employed in an amount of from about 2½ to less than 30% by weight based on the weight of the pigment. While even greater amounts can be employed, such do not appear to improve the results obtained and in some cases there is a noticeable loss in tensile strength.

While generally only one polyhydroxy compound need be employed, mixtures of such compounds can be used with equal results within the amounts indicated supra.

The polyhydroxy compounds may be applied to the pigment by spraying, by mixing, by dipping in a solution of the polyhydroxy compound, by vaporization on to the surface of the pigment, etc. Moreover, the pigment can be densified somewhat to facilitate packing and handling by wet or dry methods prior to application of the polyhydroxy compound. It has been found particularly effective to heat the pigment before, during or subsequent to its admixture with the polyhydroxy compound to temperatures of from 150 to 300° C. and preferably about 200° C. This procedure apparently results in a better orientation of the OH groups of the polyhydroxy compound with respect to the surface of the pigment.

Moreover, the pigment can be densified by wet or dry methods after applying the polyhydroxy compound.

A feature of the use of polyhydroxy compounds as described herein is that the mixing procedure does not require any special equipment or techniques. The polyhydroxy compounds mix very readily in a short time to provide an essentially dry and nonsticky pulverulent mass. The essential character of the particulate, inorganic-reinforcing pigment has been maintained, for during mixing, the fibers are not broken nor do the particles tend to agglomerate or ball up into large masses difficult to disperse into the rubber on milling or mixing.

The coated oxygen-silicon containing inorganic compounds or reinforcing pigments are incorporated by mixing or milling them into rubbery polymeric materials capable of being reinforced with carbon blacks. They may also be dispersed into latex followed by coagulation and drying. Among the rubbery materials capable of reinforcement are any vulcanizable rubbers including natural rubber, balata, and gutta percha, or such synthetic rubbers as rubbery polychloroprene and rubbery polymers of the open-chain conjugated dienes having from 4 to 8 carbon atoms such as the butadiene-1,3 hydrocarbons which include butadiene-1,3, isoprene, 2,3-dimethyl butadiene-1,3, 1,4-dimethyl butadiene-1,3, and the like; or the rubbery copolymers of these and similar conjugated diolefins with each other or with at least one copolymerizable monomeric material such as isobutylene, styrene, acrylonitrile, methacrylonitrile, methyl acrylate, methyl methacrylate, ethyl acrylate, ethyl methacrylate, 2-vinyl pyridine, and similar materials. The rubbers can likewise be mixed if desired. The rubbery diene polymers generally contain at least 50% by weight of the conjugated diene, preferably from 55 to 85% by weight. Terpolymers employing at least 35% diene may also be used. Typical rubbers in the above groups well known to the art are Buna S, GR-S, Buna N, GR-A, neoprene, Butyl and the like.

Polyacrylic vulcanizable synthetic rubbers can also be reinforced according to this invention. They are prepared by the polymerization of an acrylic acid ester or mixtures of acrylic acid esters in bulk or mass polymerization of the monomers or by the polymerization of the monomers in aqueous emulsions, and the copolymerization of acrylic acid esters with about 5 to 10 percent by weight of a chlorine-containing monomer such as chloroethyl vinyl ether, acrylonitrile, vinyl chloride, dichloro difluoro ethylene or styrene, in mass or aqueous emulsion polymerizations. Specific acrylic acid esters include among others ethyl acrylate, methyl acrylate, butyl acrylate, and the like. The polyacrylic synthetic rubbers are well known to the art and can be used alone or mixed with other rubbery materials such as rubbery polychloroprene, butadiene-1,3 and styrene copolymers, natural rubber, etc., in proportions of from about 80 to 20 parts by weight of polyacrylic rubber to 20 to 80 parts of diene rubber.

In reinforcing rubbery materials according to the teaching of the present invention a minor amount of the coated oxygen-silicon containing inorganic compound is used with a major amount of the rubbery material. However, to impart optimum reinforcement to the rubbery materials, it is preferable to incorporate in said rubber from 25 to 45% by weight of the coated oxygen-silicon containing compound where the rubber is present in an amount of from 75 to 55% by weight.

Appropriate compounding ingredients such as fillers, accelerators, vulcanizing agents, antioxidants, etc., may also be employed with the rubbery materials as is well known to those skilled in the art. Examples of some of such agents are Agerite (phenyl beta naphthylamine), Altax (2-mercapto benzothiazyle disulfide), Captax (2-mercapto benzothiazole), Santocure (N-hexyl-2-mercapto benzothiazole sulfene amide) and the like. Amines such as didodecyl amine, Rosin Amine D, secondary coco amine are preferably added to the rubbery mixtures, for they help to control the rate of vulcanization and tend to improve the abrasion resistance.

The following examples will serve to illustrate the invention with more particularity to those skilled in the art.

EXAMPLE I

Substantially fibrous silicon monoxide containing about 7% nitrogen and having an average particle size of 300 millimicrons and a surface area of about 95 m.$^2$/g. was treated with 5% of its weight of glyceryl monolaurate in an ethanol solution. The ethanol was used for densifying the silicon monoxide. After drying, 65 parts by weight of this coated silicon monoxide (containing 5% of the coating) and 100 parts by weight of natural rubber were mixed on a 6″ mill followed by 15 minutes at 150° C. in a Braebender plastograph. Then 5 parts by weight of zinc oxide, 1.5 parts by weight of stearic acid, 1 part by weight each of pine tar, Agerite, and Altax, 3 parts by weight of sulfur and 1½ parts by weight of didodecylamine were incorporated at ordinary milling temperatures on a mill. The resulting mixture was cured at 280° F. for 40 minutes. Other compositions were prepared: one in which 10% by weight of glyceryl monolaurate based on the weight of the silicon monoxide was used and the other in which no polyhydroxy compound was used to coat the silicon monoxide. After curing, tests were performed on these compositions and the data obtained from these tests are listed below.

| Silicon Monoxide Coating | 300% Modulus | Tensile Strength, p.s.i. at Break | Elongation at Break | Williams Abrasion, cc./H.P. hour loss |
| --- | --- | --- | --- | --- |
| None | 1,640 | 3,650 | 515 | 314 |
| 5% glyceryl monolaurate | 1,880 | 4,070 | 575 | 200 |
| 10% glyceryl monolaurate | 1,570 | 3,710 | 540 | 152 |

The above data show that with only 5% by weight coating of a polyhydroxy compound on the silicon-monoxide particles the improvement realized in Williams Abrasion is 50% while with 10% by weight of the same material the improvement realized is over 100% as compared to an uncoated compound. Moreover, the stock containing the reinforcing pigment coated with polyhydroxy compound is very close in abrasion resistance to a similar carbon black reinforced stock which shows a Williams Abrasion of 143.

EXAMPLE II 1,1,1-trimethylol-2,4,4-trimethyl pentane was vaporized onto the surface of fibrous silicon monoxide containing about 7% combined nitrogen and having an average particle size of 50–600 millimicrons by heating a mixture thereof with stirring at a temperature in about the range of 200° to 250° C. to provide a coating in an amount of about 10% by weight of the monoxide. 65 parts by weight of the coated silicon monoxide were then mixed with 100 parts by weight of natural rubber, 5 parts by weight of zinc oxide, 1½ parts by weight of stearic acid, 1 part by weight of pine tar, 1 part by weight of Agerite, 1 part by weight of Altax, 3 parts by weight of sulfur, and 1½ parts by weight of didodecylamine. Two other compositions were prepared and cured wherein one contained isononyl alcohol as the surface-coating material in place of the above trimethylol trimethyl pentane and wherein the other contained no surface coating. A fourth composition was prepared in which 10% by weight of the pigment of the trimethylol trimethyl pentane was mixed into the rubber followed by addition of the uncoated fibrous silicon monoxide and other compounding ingredients. The stocks were cured at 280° F. Data obtained from testing the cured compositions are shown below.

| Coating on Silicon Monoxide | Cure (min.) Optimum | 300% Modulus | Tensile Strength, p.s.i. at Break | Elongation at Break | Pico Abrasion Index [1] | Shore A Hardness |
|---|---|---|---|---|---|---|
| None | 60 | 1,200 | 2,800 | 560 | 65 | 75 |
| Isononyl Alcohol | 60 | 850 | 3,400 | 670 | 65 | 75 |
| Trimethylol trimethyl pentane | 40 | 870 | 3,500 | 620 | 82 | 65 |
| Polyhydroxy milled in rubber first | 90 | 490 | 1,530 | 585 | 65 | 72 |

[1] A full description of the apparatus and method used to determine the pico abrasion index is shown in copending application of Edwin B. Newton and Daniel S. Sears, Serial No. 433,226, filed May 28, 1954, now U.S. patent No. 2,799,155 and entitled "Apparatus and Method for Determining Abrasion Resistance." The data shown in the other examples which refer to the pico abrasion index were made using such apparatus and method.

The above data illustrate that no improvement results when a monohydroxy compound is used to provide a surface coating as compared to the results obtained when a polyhydroxy compound is employed. It is noteworthy that combined with the improved abrasion resistance, the Shore A hardness of the stock containing the trimethylol-coated pigment is appreciably lower than that conferred by the uncoated pigment. It also will be appreciated that no improvement was realized when the coating material was added separately to the rubber. The isononanol-coated compound is unacceptable from the standpoint of abrasion resistance and tensile strength. The hardness of the rubbery composition containing polyhydroxy-coated particulate silicon-monoxide material is also comparable to a similar carbon black reinforced rubber composition which exhibits a Shore A hardness of 60–65. The carbon black reinforced rubber also has a pico abrasion index of 100.

EXAMPLE III 65 parts by weight of fibrous silicon monoxide having an average particle size of 350 to 600 millimicrons and containing about 7% nitrogen was surface coated with 10% of its weight of 1,1,1-trimethylol-2,4,4-trimethyl pentane in ethanol. After drying, the coated pigment was added to 100 parts by weight of natural rubber, 5 parts by weight of zinc oxide, 1½ parts by weight of stearic acid, 1 part by weight of pine tar, 1 part by weight of Agerite, 1 part by weight of Altax, 3 parts by weight of sulfur and 1.5 parts by weight of didodecylamine. After mixing, the composition was cured for 20 minutes at 280° F. A similar composition was prepared and cured in the same manner except that the polyhydroxy compound was vaporized onto the surface of the pigment by heating to 200° C. while mixing and the total amount of coated pigment was 65 parts by weight (about 59 parts pigment and 5.9 parts polyhydroxy compound). Test results on the cured compositions are indicated below.

| Method of Coating | 300% Modulus | Tensile Strength, p.s.i. | Elongation | Pico Abrasion Index | Shore A Hardness |
|---|---|---|---|---|---|
| From Ethanol Solution | 1,310 | 3,775 | 620 | 96 | 67 |
| Vaporization | 1,050 | 4,080 | 660 | 106 | 63 |

These results show that heat treatment or vaporization of the polyhydroxy compound on the reinforcing pigment provides an increase in the abrasion resistance index even when less reinforcing pigment and consequently less coating material are used in the system with maintenance of comparable values for modulus, tensile strength and elongation. It is not precisely known why heat treatment of the reinforcing pigment during its coating with the polyhydroxy compound should result in an increase in abrasion resistance although it is believed a better orientation of polyhydroxy compounds occurs at the surface of the silicon-monoxide particles with probably the development of a hydrophobic or lipophilic coating which promotes better wetting of the pigment surface by the polymer enhancing the abrasion resistance.

EXAMPLE IV 65 parts by weight of silicon-oxyimide reinforcing pigment having an average particle size of 5–200 millimicrons are dispersed in ethanol solution for densification, dried and mixed with 100 parts by weight of natural rubber, 5 parts by weight of zinc oxide, 1½ parts by weight of stearic acid, 1 part by weight of pine tar, 1 part by weight of Agerite, 1 part by weight of Altax, 3 parts by weight of sulfur and 1½ parts by weight of didodecylamine and cured for 30 minutes. A similar composition was prepared except that 65 parts by weight of the pigment were coated with 10% of its weight of 1,1,1-trimethylol-2,4,4-trimethyl pentane which was applied from an ethanol solution for densification. The results obtained when testing these cured compositions are shown below.

| Coating on Silicon Oxyimide | 300% Modulus | Tensile Strength, p.s.i. | Elongation at Break | Pico Abrasion Index | Shore A Hardness |
|---|---|---|---|---|---|
| None | 1,320 | 3,500 | 615 | 56 | 70 |
| Trimethylol trimethyl pentane | 800 | 4,250 | 750 | 61 | 69 |

The above data indicate that the use of polyhydroxy compounds on silicon oxyimide will increase the abrasion resistance and other properties of rubbery compositions in the same manner as when silicon monoxide is used.

EXAMPLE V 65 parts by weight of fibrous silicon-monoxide reinforcing pigment of an average particle size of 50 to 600 millimicrons, containing about 7% nitrogen and a coating containing 10% of its weight of glyceryl monoricinoleate was mixed with 100 parts by weight of GR–S rubber, 5 parts by weight of zinc oxide, 1½ parts by weight of stearic acid, 1 part by weight of Agerite, 3½ parts by weight of sulfur, 1½ parts by weight of secondary coco amine and 2 parts by weight of Santocure. The resulting composition was cured for 40 minutes at 302° F. and then tested. The test data obtained are indicated below.

| 300% Modulus | Tensile Strength, p.s.i. | Ultimate Elongation, Percent | Pico Abrasion Index | Shore A Hardness |
|---|---|---|---|---|
| 1,240 | 3,380 | 600 | 86 | 65 |

The above data show the results obtained when the silicon monoxide is surface coated with a polyhydroxy compound and used to reinforce a copolymer of a major amount of butadiene-1,3 and the balance styrene.

Additional compositions were prepared and tested according to the method of Example II, supra, except that silicon oxyimide was used in some cases in place of silicon monoxide, the quantities and types of polyhydroxy compounds were varied, and the methods of coating the oxygen-silicon containing compound and curing times were also varied. Results of tests run on these compositions are shown in Table A below.

Table A

| Reinforcing Material | Coating Material | Amount of Coating Material | Method of Coating | Time of Cure, Mins. | 300% Modulus | Tensile Strength, p.s.i. | Elongation | Pico Abrasion Index | Shore "A" Hardness |
|---|---|---|---|---|---|---|---|---|---|
| Silicon oxyimide | 1,1,1-trimethylol-2,4,4-trimethyl pentane | 10% of pigment | ADV | 20 | 600 | 3,610 | 675 | 69 | 59 |
| Do | do | do | VD | 40 | 900 | 3,800 | 640 | 70 | 62 |
| Do | Pentaerythrityl monooleate | do | ADV | 20 | 1,020 | 3,750 | 625 | 94 | 60 |
| Do [1] | Glyceryl monoricinoleate | do | ADV | 20 | 890 | 3,720 | 625 | 75 | 61 |
| Fibrous Silicon monoxide | 1,1,1-trimethylol-2,4,4-trimethyl pentane | do | BV | 40 | 1,210 | 3,670 | 615 | 69 | 63 |
| Do [2] | do | do | VD | 40 | 1,130 | 3,950 | 625 | 85 | 66 |
| Do [2] | Pentaerythrityl monooleate | do | ADV | 60 | 960 | 3,950 | 700 | 87 | 57 |
| Do | do | do | ADV | 40 | 1,320 | 3,550 | 575 | 93 | 61 |
| Do | Trimethylol hexane | do | V | 40 | 1,250 | 3,430 | 575 | 99 | 67 |
| Do [3] | 2,2-diethyl propanediol-1,3 | do | AD | 40 | 1,680 | 3,770 | 550 | 89 | 70 |
| Do [3] | 2-ethyl 2-butyl propanediol-1,3 | do | AD | 40 | 1,010 | 3,800 | 650 | 67 | 62 |
| Do | Phenyl trimethylol methane | do | V | 40 | 1,300 | 4,100 | 625 | 69 | 64 |
| Do | Trimethylol propane | do | V | 40 | 1,180 | 4,170 | 650 | 85 | 71 |
| Do [3] | 1,1,1-trimethylol-2,4,4-trimethyl pentane | 30% of pigment | AD | 40 | 930 | 3,820 | 700 | 53 | 69 |
| Do [3] | do | 50% of pigment | AD | 20 | 950 | 2,800 | 550 | 55 | 67 |

[1] Pigment heated in water vapor at 95° C. prior to treatment with polyhydroxy compound.
[2] Pigment oxidized according to the method of copending application of Sears and Newton entitled "Improving Color of Pigments" referred to supra, prior to treatment with polyhydroxy compound, to change its color from brown to white.
[3] 65 parts raw pigment plus indicated amount of coating material. All others, 65 parts of coated pigment which contained indicated amount of coating.

ADV—Ethanol solution of polyhydroxy compound used to densify reinforcing pigment followed by heating while mixing to a temperature of 200–250° C.
BV—Reinforcing pigment densified by ball milling followed by vaporization of polyhydroxy compound on surface.
V—Polyhydroxy compound vaporized onto surface of reinforcing pigment by heating to a temperature of 200–250° C. while stirring.
VD—Same as V, above, followed by densification of coated pigment with ethanol.
AD—Ethanol solution of polyhydroxy compound used to coat and densify reinforcing pigment.

Considerable variation in methods of coating the oxygen-silicon containing reinforcing pigments with polyhydroxy compounds and in curing times of rubbery compositions incorporating the same can be made with achievement of satisfactory results as shown by Table A above. The data in Table A also indicates that the use of pigment containing 30% by weight or more of polyhydroxy coating results in vulcanizates having unacceptable abrasion resistance or tensile strengths. For example at 30% polyhydroxy compound on the silicon-monoxide pigment the abrasion resistance index is 53 which is not useful where the untreated material exhibits an index of 65.

EXAMPLE VI

A rubbery composition was prepared similar to that shown in Example II, supra, except that 65 parts of coated arc silica were used in place of the coated silicon monoxide. A control using 60 parts of uncoated arc silica was also prepared. The stocks were cured at 280° F., tested, and the data obtained on test are shown below.

| Pigment | Time of Cure, Min. Optimum | 300% Modulus | Tensile, p.s.i. | Ultimate Elongation, Percent | Shore A Hardness | Pico Abrasion Index |
|---|---|---|---|---|---|---|
| Coated | 90 | 500 | 4,100 | 850 | 67 | 64 |
| Uncoated | 60 | 500 | 1,700 | 625 | 77 | 59 |

In summary, the present invention teaches that valuable reinforcing pigments for rubbery vulcanizable compositions can readily be obtained by coating the surfaces of particulate inorganic oxygen-silicon containing compounds with a minor amount of a polyhydroxy compound. The compounds containing the coated reinforcing pigments have modulus, tensile strength and elongation values which are better than those exhibited by compounds containing uncoated pigments and approach carbon black-containing compounds, and, in particular, they show an abrasion resistance comparable to and even better than similar rubbers using carbon black for reinforcement. Moreover, it will be noted that the rubbery compounds containing the coated pigment show higher abrasion resistance and desirably lower hardness than similar compounds made with uncoated pigments. The polyhydroxy compounds are easily applied to the particulate inorganic oxygen-silicon material without the necessity of employing complicated procedures and equipment. The coated-reinforcing compounds are also easily mixed with the rubber and other compounding ingredients. The present invention thereby affords an economical reinforcing pigment for rubbery compounds such as tire treads, tubes, conveyor belting, shoe soles etc., and which approaches conventional carbon black-reinforcing pigments with the added advantage that white stocks can be produced. This application is a divisional application of copending application of Edwin B. Newton and Daniel S. Sears, Serial No. 433,290, filed May 28, 1954, entitled "Treatment of Pigments."

Having thus described the invention what is claimed as patentably new and is desired to be secured by U. S. Letters Patent is:

1. A particulate solid material useful in reinforcing rubbery materials and comprising a major amount of fibrous particles, having been selected from the group consisting of silicon monoxide and silicon dioxide and having been surface treated at a temperature of from about 150 to 300° C. with from about 2½% to less than 30% of the weight of said particulate material of at least one organic polyhydroxy compound selected from the group consisting of aliphatic and aryl-aliphatic polyhydroxy compounds having from 2 to 23 carbon atoms, having from 2 to 8 hydroxyl radicals and consisting of carbon, hydrogen and oxygen, said fibrous particles having an average particle length of from about 50 to 600 millimicrons in which the ratio of width to length is about from 1:10 to 1:50 and having a surface area of from 60 to 200 square meters per gram.

2. The method of making a composition characterized by its usefulness in reinforcing rubbery materials which comprises mixing at a temperature of from about 150 to 300° C. a particulate solid material comprising a major amount of fibrous particles and having been selected from the group consisting of silicon monoxide and silicon dioxide with from about 2½% to less than 30% of the weight of said particulate material of at least one organic polyhydroxy compound selected from the group consisting of aliphatic and aryl-aliphatic polyhydroxy compounds having from 2 to 23 carbon atoms, having from 2 to 8 hydroxyl radicals, and consisting of carbon, hydrogen and oxygen, said fibrous particles having an average particle length of about from 50 to 600 millimicrons in which the ratio of width to length is about from 1:10 to 1:50 and having a surface area of from 60 to 200 square meters per gram.

3. A particulate solid material useful in reinforcing rubbery materials and comprising a major amount of fibrous particles, having been selected from the group consisting of silicon monoxide and silicon dioxide and having been treated with a minor amount by weight, as compared to said particulate material, of at least one organic polyhydroxy compound selected from the group consisting of aliphatic and aryl-aliphatic polyhydroxy compounds having from 2 to 23 carbon atoms, having from 2 to 8 hydroxyl radicals and consisting of carbon, hydrogen and oxygen.

4. A particulate solid material useful in reinforcing rubbery materials and comprising a major amount of fibrous particles, having been selected from the group consisting of silicon monoxide and silicon dioxide and having been treated at a temperature of from about 150 to 300° C. with a minor amount by weight, as compared to said particulate material, of at least one organic polyhydroxy compound selected from the group consisting of aliphatic and aryl-aliphatic polyhydroxy compounds having from 2 to 23 carbon atoms, having from 2 to 8 hydroxyl radicals and consisting of carbon, hydrogen and oxygen.

5. The method which comprises treating a particulate, solid material comprising a major amount of fibrous particles and having been selected from the group consisting of silicon monoxide and silicon dioxide with a minor amount by weight, as compared to said particulate material, of at least one organic polyhydroxy compound selected from the group consisting of aliphatic and aryl-aliphatic polyhydroxy compounds having from 2 to 23 carbon atoms, having from 2 to 8 hydroxyl radicals and consisting of carbon, hydrogen and oxygen and sufficient to improve the reinforcing properties of said particulate material in rubbery materials.

6. The method which comprises treating at a temperature of from about 150 to 300° C. a particulate, solid material comprising a major amount of fibrous particles and having been selected from the group consisting of silicon monoxide and silicon dioxide with a minor amount by weight, as compared to said particulate material, of at least one organic polyhydroxy compound selected from the group consisting of aliphatic and aryl-aliphatic polyhydroxy compounds having from 2 to 23 carbon atoms, having from 2 to 8 hydroxyl radicals and consisting of carbon, hydrogen and oxygen and sufficient to improve the reinforcing properties of said particulate material in rubbery materials.

7. The method for making a composition of matter useful in reinforcing rubbery materials comprising vaporizing onto the surface of at least one particulate solid material comprising a major amount of fibrous particles and having been selected from the group consisting of silicon monoxide and silicon dioxide a minor amount by weight, based on the weight of said particulate material and sufficient to impart increased abrasion resistance and flexibility to rubbery materials in which said particulate material is incorporated, of at least one organic polyhydroxy compound selected from the group consisting of aliphatic and aryl-aliphatic polyhydroxy compounds having from 2 to 23 carbon atoms, having from 2 to 8 hydroxyl radicals and consisting of carbon, hydrogen and oxygen.

8. The method for making a composition characterized by its usefulness in reinforcing rubbery materials which comprises vaporizing at a temperature of from about 150 to 300° C. onto the surface of at least one particulate solid material comprising a major amount of fibrous particles and having been selected from the group consisting of silicon monoxide and silicon dioxide from about 2½ to less than 30% by weight, based on the weight of said particulate material, of at least one organic polyhydroxy compound selected from the group consisting of aliphatic and aryl-aliphatic polyhydroxy compounds having from 2 to 23 carbon atoms, having from 2 to 8 hydroxyl radicals and consisting of carbon, hydrogen and oxygen.

9. A particulate solid material according to claim 1 in which the polar hydroxyl groups of said polyhydroxy compound are located near each other and near one end of the molecule of said polyhydroxy compound.

10. The method according to claim 2 in which the polar hydroxyl groups of said polyhydroxy compound are located near each other and near one end of the molecule of said polyhydroxy compound.

11. A particulate solid material according to claim 9 in which said polyhydroxy compound comprises 1,1,1-trimethylol-2,4,4-trimethyl pentane.

12. A particulate solid material according to claim 9 in which said polyhydroxy compound comprises glyceryl monoricinoleate.

13. A particulate solid material according to claim 9 in which said polyhydroxy compound comprises pentaerythrityl monooleate.

14. A particulate solid material according to claim 9 in which said polyhydroxy compound comprises glyceryl monolaurate.

15. A particulate solid material according to claim 9 in which said polyhydroxy compound comprises 1,1,1-trimethylol hexane.

16. The method according to claim 10 in which said polyhydroxy compound comprises 1,1,1-trimethylol-2,4,4-trimethyl pentane.

17. The method according to claim 10 in which said polyhydroxy compound comprises glyceryl monoricinoleate.

18. The method according to claim 10 in which said polyhydroxy compound comprises pentaerythrityl monooleate.

19. The method according to claim 10 in which said polyhydroxy compound comprises glyceryl monolaurate.

20. The method according to claim 10 in which said polyhydroxy compound comprises 1,1,1-trimethylol hexane.

References Cited in the file of this patent

UNITED STATES PATENTS

| | | |
|---|---|---|
| 2,657,149 | Iler | Oct. 27, 1953 |
| 2,692,869 | Pechukas | Oct. 26, 1954 |
| 2,739,076 | Iler | Mar. 20, 1956 |

UNITED STATES PATENT OFFICE

CERTIFICATE OF CORRECTION

Patent No. 2,882,177                        April 14, 1959

Edwin B. Newton et al.

It is hereby certified that error appears in the printed specification of the above numbered patent requiring correction and that the said Letters Patent should read as corrected below.

Column 1, line 63, beginning with "A still further" strike out all to and including "reinforcing properties." in line 66, same column; column 2, line 39, for "particue" read -- particle --.

Signed and sealed this 29th day of November 1960.

(SEAL)
Attest:

KARL H. AXLINE
Attesting Officer

ROBERT C. WATSON
Commissioner of Patents